United States Patent [19]

Baskins et al.

[11] 4,419,616
[45] Dec. 6, 1983

[54] POWER-UP RACK AND METHOD OF USE IN ASSOCIATION WITH PORTABLE MICROCOMPUTERS WITHIN A REFINERY AND THE LIKE

[75] Inventors: Lew E. Baskins, Torrance; J. Patrick Ellis, Manhattan Beach, both of Calif.

[73] Assignee: Chevron Research Company, San Francisco, Calif.

[21] Appl. No.: 220,627

[22] Filed: Dec. 29, 1980

[51] Int. Cl.³ .............................................. H02J 7/00
[52] U.S. Cl. ........................................ 320/2; 364/464
[58] Field of Search ............... 320/2, 39, 40; 364/464, 364/465

[56] References Cited

U.S. PATENT DOCUMENTS 3,293,528 12/1966 Rosen et al. ............................. 320/2
3,359,635 12/1967 Jepson et al. ........................ 320/2 X
3,924,097 12/1975 Knowles et al. ..................... 320/2 X
4,229,829 10/1980 Grunwald ........................... 320/2 X

FOREIGN PATENT DOCUMENTS 2517035 10/1976 Fed. Rep. of Germany .......... 320/2

Primary Examiner—R. J. Hickey
Attorney, Agent, or Firm—Edward J. Keeling; H. D. Messner

[57] ABSTRACT

A power-up storage rack for microcomputers is provided for use in accommodating automatic recharging of each microcomputer irrespective of its multiple uses by several different operators. The rack resembles an H-shaped channel beam. Recharging results via electrical interconnection of multi-pin (male-female) receptacles of the rack and microcomputer with a source of electrical energy as through a transformer. An indicator light can also be activated by such electrical engagement.

5 Claims, 6 Drawing Figures

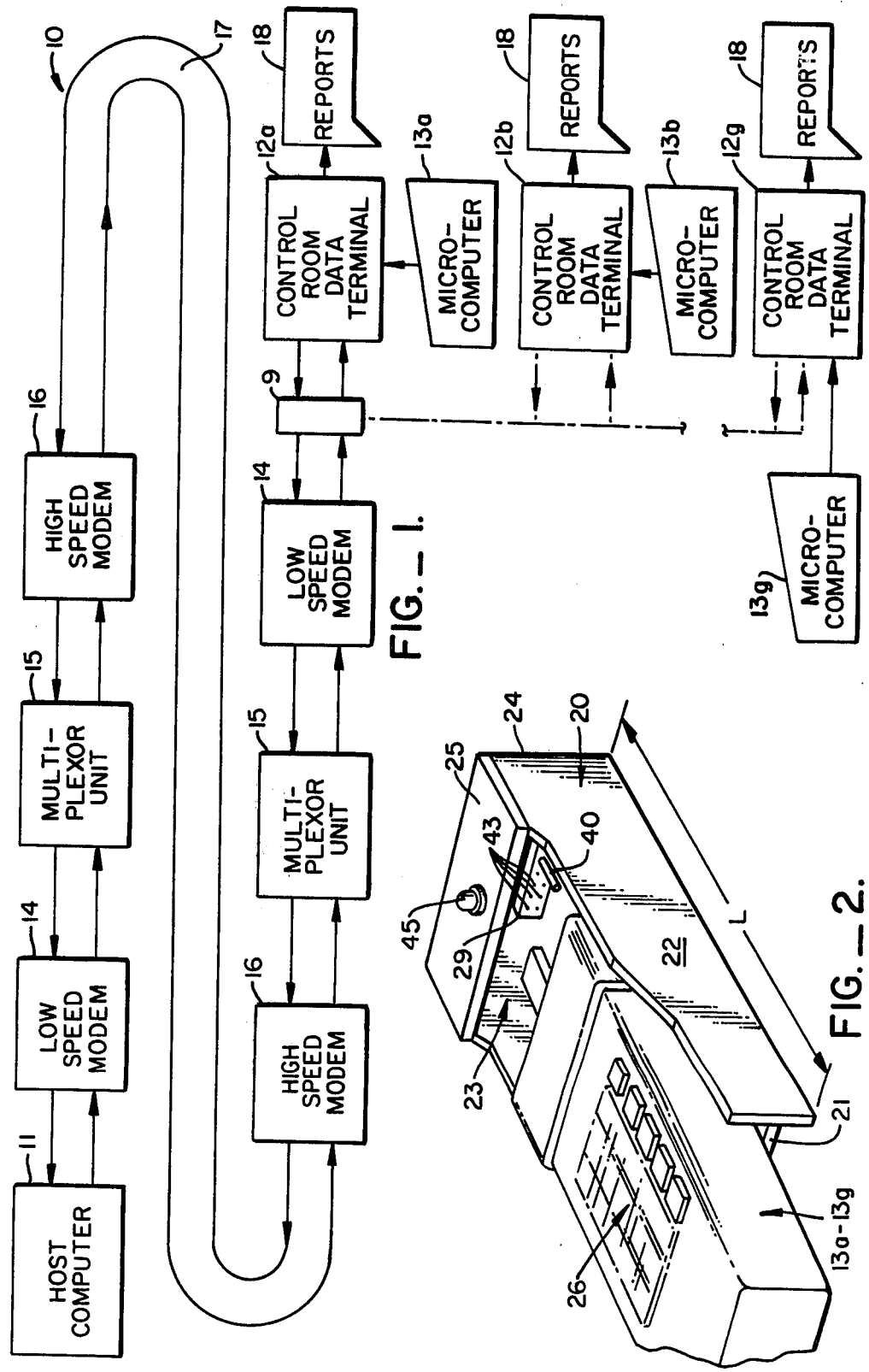

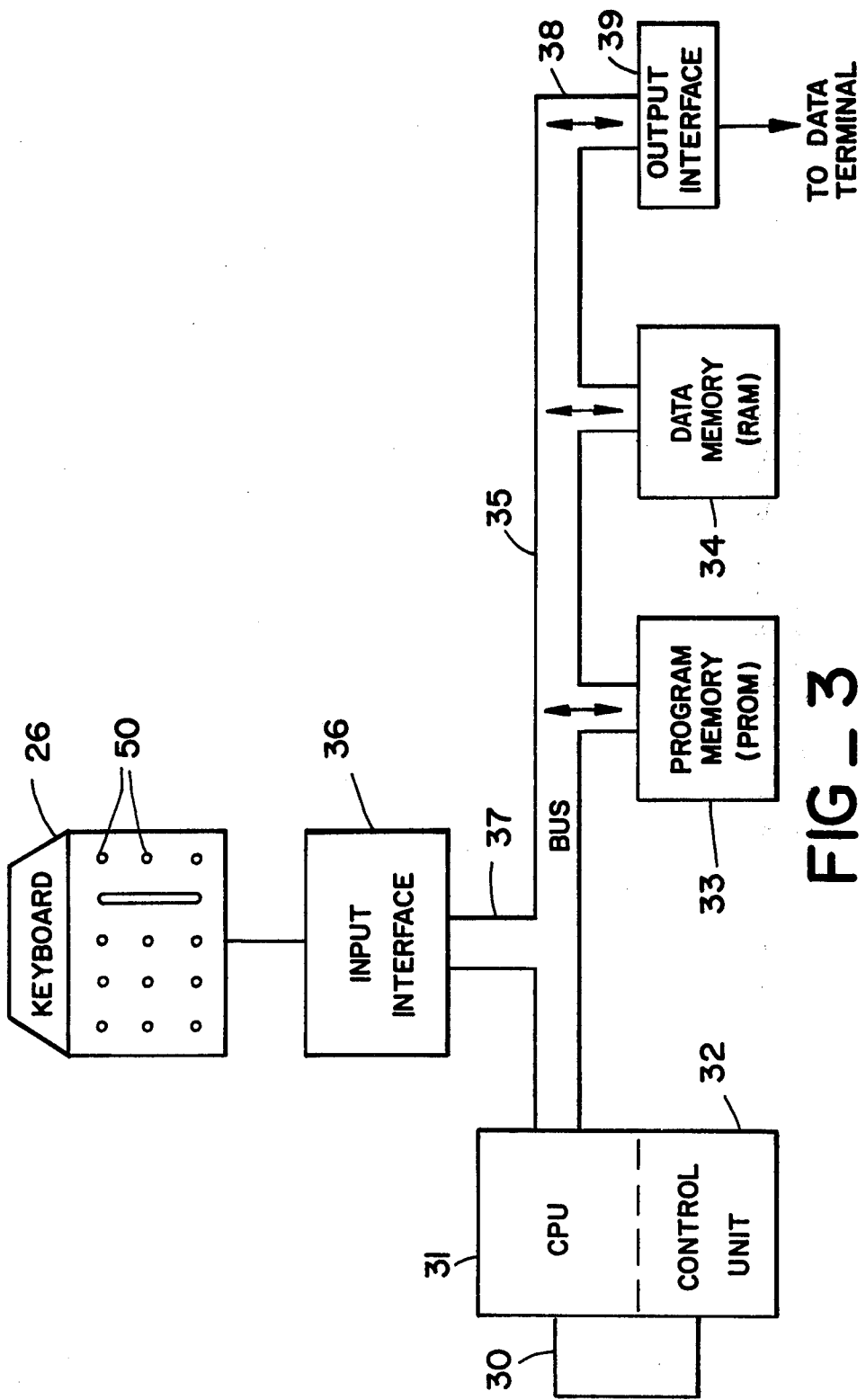
FIG_3

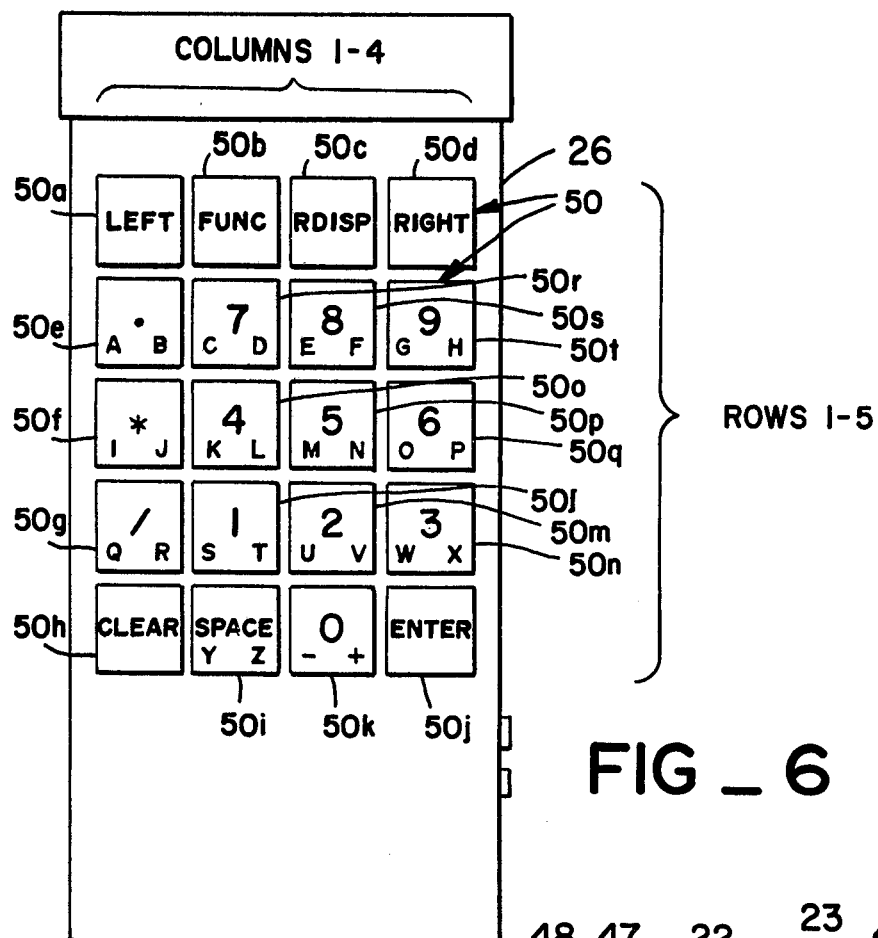
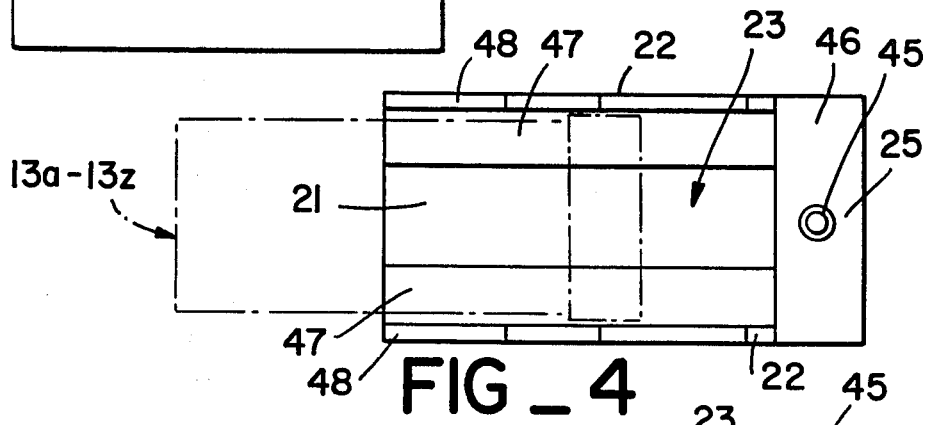
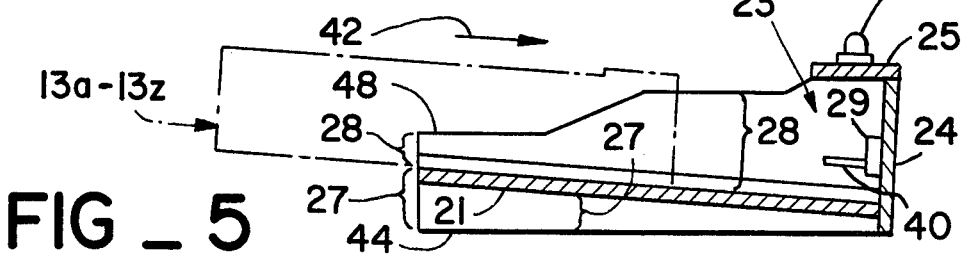

POWER-UP RACK AND METHOD OF USE IN ASSOCIATION WITH PORTABLE MICROCOMPUTERS WITHIN A REFINERY AND THE LIKE

SCOPE OF THE INVENTION

The present invention relates to a power-up rack and its method of use in conjunction with a portable microcomputer adopted to gather engineering data within a refinery or chemical complex.

BACKGROUND OF THE INVENTION

Today, managements of chemical and refinery complexes require effective collection and speedy analysis of day-to-day operational data. Computerization has helped. For example, instead of an operator collecting the data by pencil-and-paper followed by once-a-day encoding of the data at the central computer, the operator can now use a programmable portable microcomputer for collecting the data and then use automatic encoding techniques to access that data to a central computer from one or more data terminals within the complex.

However, the increased frequency of use of each microcomputer (often shared by several operators) has brought about problems of maintenance of the instruments. During storage, for example, the battery packs may or may not be checked; as a result, the instruments may be used in an under powered state, i.e., they're used even though not adequately charged. Result: uneven storage as data is collected in the field, or if properly encoded, the data may later be lost during accessing from the memory of the microcomputer to the main computer.

SUMMARY OF THE INVENTION

The present invention relates to a power-up storage rack and method adopted to accommodate automatic recharging of a microcomputer irrespective of its multiple uses by several different operators. The rack resembles a H-shaped channel beam. The cross-member of the H-beam slopes front-to-back and is of sufficient length to allow easy entry of the microcomputer; for the most part, the top is open so that the microcomputer's keyboard is exposed; recharging results via electrical interconnection between multi-pin (male-female) receptacles of the rack and microcomputer, with a source of electrical energy as through a transformer. An indicator light is also in circuit, and is activated by the engagement of the receptacles. Result: Fail-safe recharging of the microcomputer can occur within the view of the operator. An overload circuit within the microcomputer can also be used to automatically disconnect the power-up circuit of the present invention from the microcomputer battery pack when the latter is charged.

DETAILED DESCRIPTION OF THE DRAWINGS

FIG. 1 illustrates a microcomputer-associated, data communication system for use within a refinery or chemical complex;

FIG. 2 is a prospective view of the microcomputer of FIG. 2 in power-up, recharging relationship with a power-up storage rack of the present invention;

FIG. 3 is a block diagram of the microcomputer of FIG. 1;

FIGS. 4 and 5 are details of the power-up rack of FIG. 2;

FIG. 6 is a detailed view of the keyboard of the microcomputer of FIG. 3.

DETAILED DESCRIPTION OF AN EMBODIMENT OF THE INVENTION

Referring to FIG. 1 there is illustrated a computer-dominated communication system 10 for use in association with operations of a chemical or refinery complex.

System 10 includes a host computer 11 in multiplexed relationship with various control rooms of the chemical or refinery complex. Interconnection of the elements begins with a series of data terminals 12a, 12b . . . 12z. Each terminal 12a, 12b . . . 12z includes an interrogatable microcomputer 13a . . . 13z. Each microcomputer is shown in an active state: data is being excessed from memory. Ultimate destination: host computer 11 via telephone switching circuitry 9, low-speed modums 14, multiplexers 15, high speed modums 16 and telephone line 17. Each terminal 12a, 12b . . . 12z includes a printer (not shown) controlled by host computer 11. After analysis of the data by the host computer, finished results including reports 18 are provided each data terminal 12a, 12b . . . 12z. Of course, the interactive data flow to and from each terminal 12a, 12b . . . 12z vis-a-vis host computer 11, depends on accurate operation of each associated microcomputer 13a, 13b . . . 13z. And an important aspect of accurate operation is their maintenance including automatic recharging of their power packs, when required, as by means of power-up storage rack 20 of FIG. 2.

As shown, power-up storage rack 20 is adopted to accommodate microcomputers 13a, 13b . . . 13z of FIG. 1 for recharging purposes, on a serial basis.

Briefly, rack 20 resembles an H-shaped channel beam. Its cross-member 21 slopes front-to-back, and combines with side walls 22 to form an easy accessible U-shaped repository 23. Repository 23 has a length dimension L where L is greater than that of the microcomputer 13a, 13b . . . 13z. A small segment of the repository 23 is closed, in the vicinity of end wall 24 via top wall 25. Result: keyboard 26 of the microcomputer is usable even though positioned within the repository 23.

FIG. 3 illustrates the microcomputer 13a–13z of FIG. 2 in still more detail.

As shown, the microcomputer of FIG. 2 is powered by a chargeable battery pack 30 which serves as a source of electrical energy for CPU 31 and control unit 32, as well as for associated circuitry. CPU 31 is conventional. It is controlled by control unit 32. Two memory units 33 and 34 are also shown. They operationally connect to the CPU 31 as through bus 35. Program memory unit 33 stores instructions for directing the activity of the CPU 31; while data memory unit 34 contains data (as data words) related to the refinery operations. Encoding is provided by keyboard 26. Data flow is via interface 36 and port 37. The CPU 31 can rapidly cause accessing of such data after storage within memory unit 34 (by addressing a particular output port, say port 38 and thence to output interface 39, on command. In that way, the data stored within the memory 34, flows to, and acted on by, the host computer 11 of FIG. 1.

During operations, control circuitry 32 maintains the proper sequencing of information required for any processing task. For example, after instructions are fetched and decoded, the control circuitry 32 can issue the appropriate signals to initiate and sustain processing. The control circuitry 32 is also capable of responding to external signals, such as an interrupt-wait request. An interrupt request will call the control circuitry 32 to temporarily interrupt main program execution, jump to a special address to service the interrupting device and then automatically return to the main program, when the task has been completed.

Again in FIG. 3, note port 37. As shown, it connects via input interface 36 to keyboard 26. In that way, refinery operational data as previously discussed can be encoded into the memory 34. Mode of encoding: activation of different keys 50 comprising the keyboard 26. Such encoding occurs provided the power pack 30 of each microcomputer is adequately charged.

FIGS. 4 and 5 illustrates power-up storage rack 20 of the present invention in still more detail.

As previously mentioned, parallel side walls 22 are tied together—constructionwise—via cross-member 21, as well as by the end wall 24 and top wall 25. Since the cross-member 21 slopes front-to-back the vertical dimension of each side wall 22 above and below the cross-member 21 changes as a function of length. Resulting legs 27, as well as header section 28 vary in height measured from the cross-member 21, as shown, see FIG. 5; the header section 28, of course, forms the sides of the U-shaped repository 23 previously mentioned and must be correctly aligned so as to accept the microcomputer 13a–13g during recharging (compare FIGS. 4 and 5, for example).

Note that at end wall 24 there is provided receptacle 29. The receptacle 29 is located about mid-height of the end wall 24 midway between the side walls 22. Electrical connection (to an AC source) is via a transformer and plug (not shown). Receptacle 29 is conventional. It includes a positioning rod 40 and rows-and-columns of pins 43 (see FIG. 2). The former inserts into a female positioning mount of a like-constructed receptacle (not shown) of the microcomputer of FIG. 2.

Also note that cross-member 21 of FIG. 5 is not parallel to a horizontal plan intercepting edge 44 of the legs 27. Instead, it slopes front-to-back so as to allow an operator, standing above the rack, to easily insert the microcomputer within the repository 23 and to bring about electrical engagement between the respective receptacles of the rack and microcomputer. Note in this regard that an indicator light 45 is also energized when such coupling occurs.

Because the indicator light 45 is supported on an upper surface 46 of top wall 25, the operator can readily verify that charging is (or is not) occurring, after insertion of the microcomputer has occurred. Since the microcomputer includes an overload circuit (operative when the microcomputer is charged) indicator light 45 is inactive when the overload circuit is in operation.

Length of the rack 20 of the present invention in the direction of arrow 42 (FIG. 5) must be at least as long as a similar dimension of the microcomputer. Consequently, if the microcomputer has a certain length, then the length of the rack in the direction of arrow 42 should be greater than that length.

Cross-member 21 is also reduced over at its central region. Rails 47 are placed at the junction of the side walls 22 with the cross-member 21 for this purpose. Result: sufficient clearance is provided to clear travel of the microcomputer along the rails 47 during insertion of the microcomputer into the repository 23 in the direction of arrow 42. Also, friction is minimized. Each microcomputer is usually protected by a snugly fitting outer sheath, not shown. The sheath is made of a soft material, e.g., a leatherette or the like, to protect the microcomputer against damage during use within the refinery. Such a sheath is not only open in the vicinity of its contact surface with end wall 24, for electrical connection purposes, but also is open in the neighborhood of keyboard 26.

Note that each side wall 22 also has a stepped upper surface 48. It varys in height above cross-member 21. It is shortest at the near (open) end and is tallest at the far end adjacent to end wall 24, viz, at its connection with top wall 25. The operator is allowed to view and manipulate the keyboard 26 even when the microcomputer is a storage and/or a recharging mode.

As indicated in FIG. 6, keyboard 26 consists of rows-and-columns of keys 50 that have sufficient space surrounding each key as to be depressable by the operator including any operator who has stubby fingers. Control keys 50a, 50b . . . 50j are located in rows 1 and 5; and column 1; data keys 50k–50t are more centrally located in columns 2, 3 and 4 as shown. In operations, the operator first uses the keys 50 in a portable loading mode in which he inputs the data into memory as he passes from indicator-to-indicator within his area of responsibility within the chemical or refinery complex. At a data terminal, after the microcomputer has been coupled into the communication system 10 of FIG. 1, the data is then accessed to the host computer 11. After the data has been analyzed and retransformed, the results are returned to the data terminal for appropriate display as previously indicated.

The present invention is not limited to the above description of an embodiment thereof as many substitutions are really apparent to those skilled in the art, and thus the invention is given the broadest interpretation within the terms of the following claims.

What is claimed is:

1. A power-up rack for a programmable microcomputer used to gather engineering data within a refinery or chemical complex for later automatic transmission to a central computer via a communication link, said microcomputer having a series of keys arranged in rows-and-columns over a top surface thereof and a first multi-pin receptacle for recharging purposes, mounted at a far end thereof comprising:

a H-shaped support means including twin up-right wall means, cross-member means connected to said wall means and end wall means forming a repository to accept and accommodate said microcomputer in a recharging electrical engagement, said repository being U-shaped throughout a substantial portion of its length, with the open side of the U facing outwardly wherein loading of said microcomputer into said rack from a loading position above said cross-member means is facilitated, said cross-member means sloping front-to-back as a function of its length, said end wall means having a second multi-pin receptacle mounted thereon and adapted to engage said first receptacle in a power-up, recharging relationship said support means including top wall means attached to said side wall means and end wall means, and a light indicator supported on said top wall means in electrical circuit with and activated by electrical engagement of said first and second receptacles, said top wall being of limited cross-wise dimension so as to extend only a slight amount into said open side of said U-shaped repository whereby when said microcomputer is loaded into said repository for recharging same, said series of keys of said microcomputer can be manipulated for testing purposes, without removal of said microcomputer from said repository.

2. Said rack of claim 1 in which said cross-member means varies in thickness across its width.

3. Method of using an H-shaped power-up rack for recharging a programmable microcomputer used to gather data within a refinery or chemical complex, for later automatic transmission to a central computer, said microcomputer also arranged to have a series of keys over a top surface thereof in rows-and-columns, and a first multi-pin receptacle mounted at a far end thereof, comprising:

(a) positioning said H-shaped rack on a substantially horizontal surface, said rack including twin upright wall means, a cross-member connected said wall means and end wall means forming a U-shaped repository to accept and accommodate said microcomputer in a recharging electrical engagement;

(b) loading the microcomputer into said U-shaped repository of said rack by initial engagement between said cross-member of said H-shaped rack and said microcomputer from a loading position above said cross-member;

(c) causing rectilinear travel of said microcomputer front-to-back along said cross-member until electrical engagement between said first receptacle and a second receptacle attached to said rack, occurs;

(d) observing a light indicator in circuit with said first and second receptacles, the activation of which indicating the occurrence of recharging of said microcomputer and (e) testing fieldworthiness of said microcomputer without removing same from said repository by testing functional operations thereof using input parameters provided by manipulation of said keys unobstructively keyable via the open side of the U-shaped repository of said rack.

4. Method of claim 3 in which said rectilinear travel is accompanied by a change in elevation, front-to-back, of said microcomputer as a function of length along said cross-member means of said rack.

5. Method of claim 4 with the additional step of removing said microcomputer from said rack when recharging is completed.

* * * * *